S. Davis.
Car-Brake.

N° 71856

Patented Dec. 10, 1867

Witnesses:

Inventor:
Shadrach Davis

United States Patent Office.

SHADRACH DAVIS, OF DARTMOUTH, MASSACHUSETTS.

Letters Patent No. 71,856, dated December 10, 1867.

IMPROVED CAR-BRAKE.

*The Schedule referred to in these Letters Patent and making part of the same.*

TO ALL WHOM IT MAY CONCERN:

Be it known that I, SHADRACH DAVIS, of Dartmouth, in the county of Bristol, in the State of Massachusetts, have invented a new and improved Brake for Steam and other Carriages; and I do hereby declare that the following is a full and exact description thereof, reference being had to the accompanying drawings, and to the letters of reference marked thereon.

My invention consists in applying the friction to the wheels in such a manner that their rotation will assist in operating the brakes, and cause the shoes to adhere more firmly to the wheels, and attaching the shoes to the frame by movable joints, so that the friction will be even on the wheels, &c.

Figure 2:
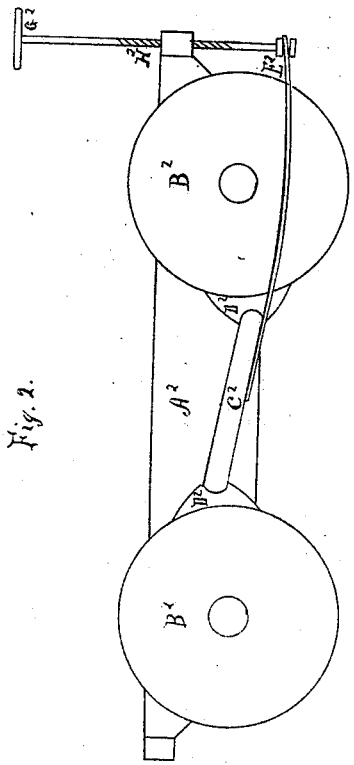
Figure 3:
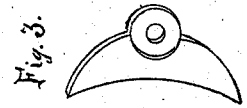
Figure 1:
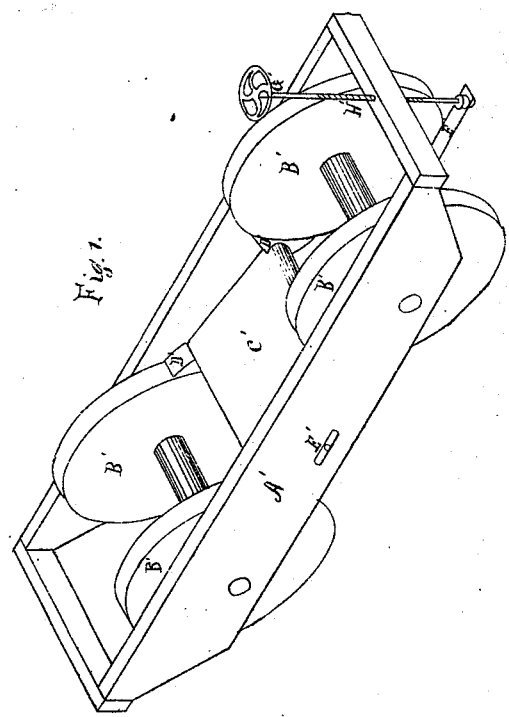

Figure 1 is a perspective view of a car-truck with my invention applied to it.
Figure 2 is a longitudinal section of a car-truck with my invention applied.
Figure 3 is a view of a shoe, showing the manner in which the joint is made.

Fig. 1. $A^1$ is the truck; $B^1 B^1$, &c., wheels; $C^1$, brake; $D^1 D^1$, shoes; $E^1$, rod or bar attached at one end to brake $C^1$, and at the other end to the lower end of screw $H^1$; $F^1$, end of pin in brake $C^1$, by which the brake is supported; $G^1$, wheel on the upper end of screw, by which the brake is operated. Fig. 2. $A^2$, car-truck; $B^2 B^2$, wheels; $C^2$, brake; $D^2 D^2$, shoes on brake; $E^2$, rod or bar attached at one end to the brake, and connected at the other end to lower end of the screw $H^2$; $G^2$, wheels secured to upper end of screw. Fig. 3, shoe, showing the manner of making the joint.

Operation.

The brakes being applied between the wheels, as herein shown, the shoes affixed in a movable joint, as also represented, the novelty and operation may be noted. By revolving wheel $G^1$ the proper way, the screw H is raised, lifting with it the end of lever $E^1$, thereby causing the shoes on the brake to be brought in contact with the wheels of the carriage, as will be observed, and the shoes being constructed with movable joints, their whole surfaces are brought in contact with the peripheries of the wheels, and greater friction is therefrom attained than by those brakes which only bring one end of the shoes to bear against the wheels; besides, the rotation of the wheels causes the brakes to more firmly adhere to them.

Claim.

What I claim as my invention, and desire to secure by Letters Patent, is—

A car-brake, consisting of the broad connecting-bar $C^1$, which rests on pivots $F^1$, working in slots, and has the brake-shoes movably fixed to it, the whole combined as described, operated by the bar $E^2$ and screw-rod $H^2$; and by contact with the wheels, as and for the purposes set forth.

SHADRACH DAVIS.

Witnesses:
 JOHN A. HATHAWAY,
 JNO. DAVIS.